(12) United States Patent
Cain

(10) Patent No.: US 11,451,606 B2
(45) Date of Patent: Sep. 20, 2022

(54) SYSTEM AND METHOD FOR MOVING MEDIA CONTENT OVER A NETWORK

(71) Applicant: Grass Valley Limited, Newbury (GB)

(72) Inventor: James Westland Cain, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 17/457,343

(22) Filed: Dec. 2, 2021

(65) Prior Publication Data
US 2022/0191264 A1 Jun. 16, 2022

Related U.S. Application Data

(60) Provisional application No. 63/126,409, filed on Dec. 16, 2020.

(51) Int. Cl.
*H04L 65/75* (2022.01)
*H04L 65/80* (2022.01)
*H04L 65/612* (2022.01)

(52) U.S. Cl.
CPC ............ *H04L 65/762* (2022.05); *H04L 65/80* (2013.01); *H04L 65/612* (2022.05)

(58) Field of Classification Search
CPC ..... H04L 65/762; H04L 65/80; H04L 65/612; H04L 65/765
See application file for complete search history.

(56) References Cited

U.S. PATENT DOCUMENTS

| | | | |
|---|---|---|---|
| 2012/0311177 A1 | 12/2012 | Visharam et al. | |
| 2013/0173747 A1* | 7/2013 | Kim | H04L 67/02 709/217 |
| 2014/0189772 A1 | 7/2014 | Yamagishi et al. | |
| 2020/0328980 A1* | 10/2020 | Ohno | H04L 65/65 |
| 2022/0095002 A1* | 3/2022 | Zhou | H04N 21/6581 |

FOREIGN PATENT DOCUMENTS

GB 2561526 A 10/2018

OTHER PUBLICATIONS

International Search Report of related application PCT/GB2021/053341, dated Mar. 14, 2022.
Anonymous: "DASH-F Position Paper: Server and Network Assisted DASH (SAND)", Dash Industry Forum, Dec. 1, 2016, XP055742200, 20 pages.

* cited by examiner

*Primary Examiner* — Wing F Chan
*Assistant Examiner* — Billy H Ng
(74) *Attorney, Agent, or Firm* — ArentFox Schiff LLP

(57) ABSTRACT

A system for providing media essence includes a media managing processor that receives a transfer request that defines a minimum format quality and a required time for media essence to be available, and generates a media transfer work list that identifies a task for transferring a required range defined by the request. The system includes a media mover worker that selects a source site that has a first flow that includes the required range at a first format that satisfies the defined format quality, executes a load operation from the selected source site to the identified target site, updates a media mover queue to include the task to monitor a progress of the load operation, and controls the selected source site to load a second flow of the essence at a second lower format when the monitored progress indicates the load operation will not be completed by the required time.

9 Claims, 6 Drawing Sheets

SYSTEM AND METHOD FOR MOVING MEDIA CONTENT OVER A NETWORK

CROSS REFERENCE TO RELATED APPLICATIONS

The current application claims priority to U.S. Patent Provisional Application No. 63/126,409, filed Dec. 16, 2020, the entire contents of which are hereby incorporated by reference.

TECHNICAL FIELD

The current application relates to a system and method for managing media content, and, more particularly, to a system and method moving media content over a network by a media manager to a target site.

BACKGROUND

With the ever increasing amount of media content that is being generated and stored for later recall, entities and individuals are constantly searching for techniques to minimize resource consumption and reduce costs for such media storage and subsequent access to be used, for example, as part of a media production.

Currently, content consumers typically archive one or multiple versions of media essence in a specific location and for recall at a subsequent point in time. By doing so, the amount of media essence stored at a given location can quickly become very costly and in some instances unmanageable. In other instances, content consumers may ingest live content for consumption. In either case, when a user requests to access a specific file of media essence, the media essence is usually provided as an entire file even if the user only needs a fraction of the content therein. As such, there is a need for a system and a method to more efficiently and effective move media content through a network that can be used, for example, as part of a media production environment.

SUMMARY OF THE INVENTION

Accordingly, a system and method is disclosed herein for moving essence (e.g., media content) through a network for media production and/or editing, for example. The exemplary system is configured as "essence mover" that is identity, location, form, cost and/or time aware of the transfer of content, such that the essence movement is configured to meet desired criteria for a media transfer request. Moreover, the system can issue reports if the criteria for moving the essence cannot be met. In one aspect, the essence mover is designed and configured to move and transform essence over wide area networks, efficiently and securely, but can also benefit on a local area network (LAN).

According to an exemplary embodiment, a system is disclosed for providing media essence over a network. The system includes a plurality of source locations that are each configured to store a plurality of sources that are single streams of media essence. In addition, each of the plurality of sources at a source location has a plurality of flows that each define a single form of equivalent media essence in a different format, and each flow is comprised of respective ranges of grains of the media essence. The system also includes a target site configured as a destination for media essence, with the target site being configured to receive available formats of the media essence that can be natively stored thereon. A media managing processor (e.g., the essence mover) is configured to receive a transfer request that identifies the target site as the destination for a plurality of ranges of the media essence, with the transfer request defining a minimum format quality and a required time for the plurality of ranges of the media essence to be available, query the target site to identify any existing ranges of the plurality of ranges of the media essence that are stored thereon and that satisfy the defined minimum format quality, control the target site to lock the identified existing ranges of the plurality of ranges of the media essence from being deleted, and generate a media transfer work list that identifies a task for transferring at least one required range of the plurality of ranges defined by the transfer request that is not available at the target site. The system further includes a media mover worker configured to select at least one source location of the plurality of source locations that has a first flow that includes the at least one required range of the media essence at a first format that satisfies the defined minimum format quality, execute a load operation of the at least one required range of media essence from the at least one selected source location to the identified target site, update a media mover queue to include the task to monitor a progress of the load operation for satisfying the required time, and control the selected at least one source location to load a second flow that includes the at least one required range of the media essence at a second format that is lower than the first format when the monitored progress indicates that the load operation will not be completed by the required time.

According to an exemplary embodiment, each of the plurality of source sites is configured to store an identification for each of the respective ranges of grains of each flow, and the media mover is configured to select the at least one source site based on the respective identification for the at least one required range of the media essence.

According to another exemplary embodiment, the media mover is configured to control the selected at least one source site to load the second flow that includes the at least one required range of the media essence at the second format to change a byte rate of the load operation to ensure that the at least one required range of the media essence is delivered to the target site by the required time.

According to another exemplary embodiment, the media mover is further configured to transcode the at least one required range of the media essence from the first format to another format to ensure the at least one required range of the media essence satisfies the defined minimum format quality.

According to another exemplary embodiment, the media managing processor is configured to determine a delta that identifies the at least one required range of the plurality of ranges that is not available at the target site by comparing the locked existing ranges of the plurality of ranges of the media essence at the target site with the plurality of ranges of the media essence listed in the received transfer request.

According to another exemplary embodiment, the media mover is configured to dynamically provide a status report to the target site to confirm whether the plurality of ranges of the media essence will be delivered at the minimum format quality and by the required time, such that the target site maintains a list of arriving ranges of the media essence to prevent overlapping requests of media essence.

According to another exemplary embodiment, the media managing processor is configured to prioritize the generated media transfer work list by reordering each of the plurality of ranges based on a number of requests for each respective range of the media essence.

In another exemplary embodiment, a system is disclosed for providing media essence over a network. In this aspect, the system includes a media managing processor configured to: receive a transfer request from a target site as a destination for a plurality of ranges of the media essence, with the transfer request defining a minimum format quality and a required time for the plurality of ranges of the media essence to be available, query the target site to identify any existing ranges of the plurality of ranges of the media essence that are stored thereon and that satisfy the defined minimum format quality, control the target site to lock the identified existing ranges of the plurality of ranges of the media essence from being deleted; and generate a media transfer work list that identifies a task for transferring at least one required range of the plurality of ranges defined by the transfer request that is not available at the target site. The system also includes a media mover worker configured to select at least one source site of a plurality of source sites that has a first flow that includes the at least one required range of the media essence at a first format that satisfies the defined minimum format quality, execute a load operation of the at least one required range of media essence from the at least one selected source site to the identified target site, update a media mover queue to include the task to monitor a progress of the load operation for satisfying the required time, and control the selected at least one source site to load a second flow that includes the at least one required range of the media essence at a second format that is lower than the first format when the monitored progress indicates that the load operation will not be completed by the required time.

In another exemplary embodiment, a system is disclosed for providing media essence over a network. In this aspect, the system includes a media managing processor configured to receive a transfer request from a target site as a destination for a plurality of ranges of the media essence, with the transfer request defining a minimum format quality and a required time for the plurality of ranges of the media essence to be available, and generate a media transfer work list that identifies a task for transferring at least one required range of the plurality of ranges defined by the transfer request. The system also includes a media mover worker configured to select at least one source site of a plurality of source sites that has a first flow that includes the at least one required range of the media essence at a first format that satisfies the defined minimum format quality, execute a load operation of the at least one required range of media essence from the at least one selected source site to the identified target site, update a media mover queue to include the task to monitor a progress of the load operation for satisfying the required time, and control the selected at least one source site to load a second flow that includes the at least one required range of the media essence at a second format that is lower than the first format when the monitored progress indicates that the load operation will not be completed by the required time.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
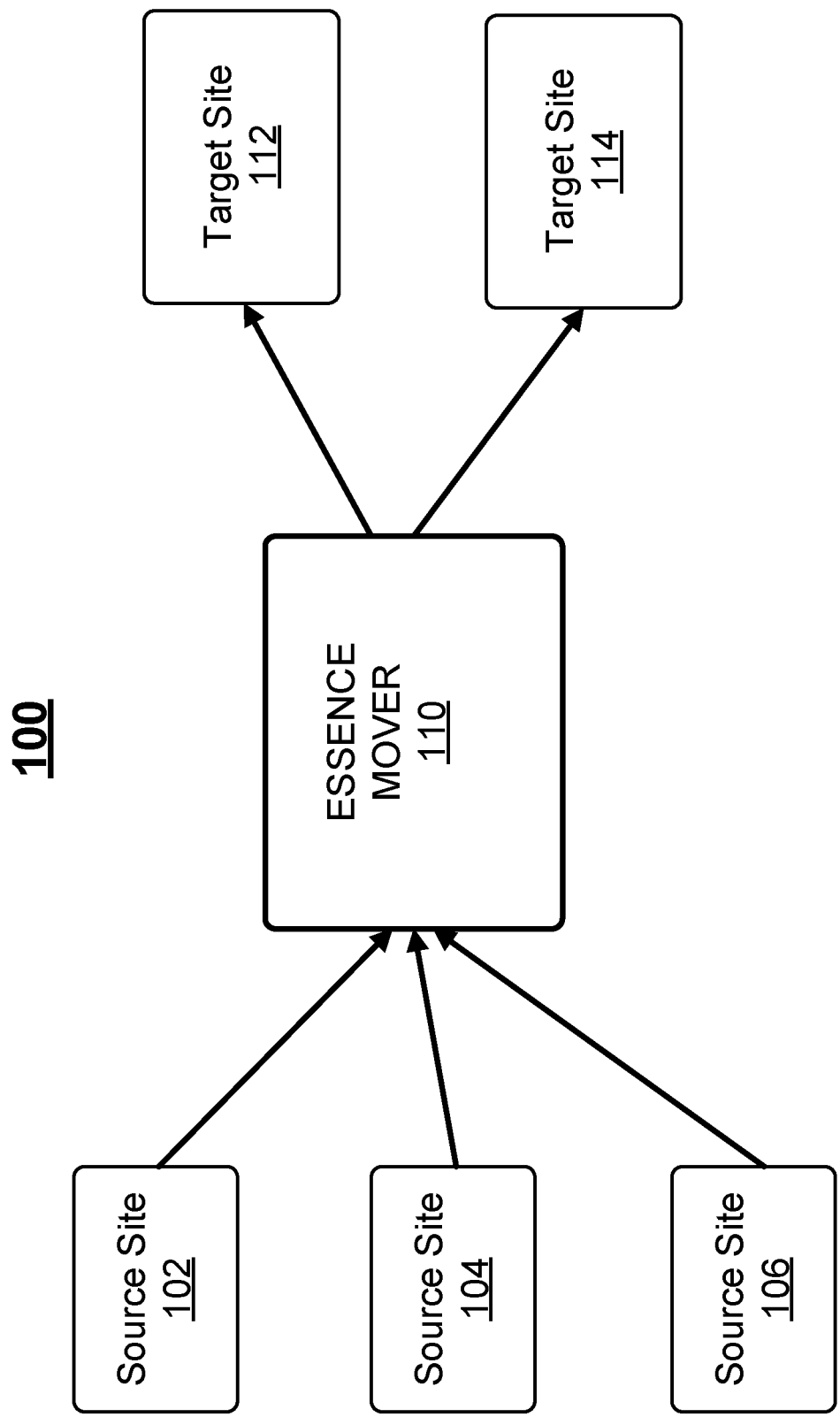
FIG. 1 illustrates a high-level block diagram of a system for moving media content over a network according to an exemplary aspect.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, the system and method disclosed herein is constructed for moving essence through a network for media production and/or editing, for example. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

For purposes of this disclosure, essence can generally be considered as media content or media assets, such as any type of media file, such as media, video, audio, captions or the like, that can be consumed by a content consuming device. The system disclosed herein can be considered an "essence mover" and it is identity, location, form, cost and time aware, such that the essence movement is configured to meet desired criteria, and the system can issue reports if the criteria for moving the essence cannot be met. The essence mover is constructed to optimize the transfer of media essence from multiple sources to multiple destinations to be acted thereon. Because the essence mover is identity, location, form, cost and time aware, the essence mover effectively maintains intrinsic knowledge of the metadata relating to the target essence and uses this knowledge of such metadata to develop better (e.g., more efficient) algorithms for effectuating the transfer of the media essence to the destinations.

FIG. 1 illustrates a high-level block diagram of a system for moving media content over a network according to an exemplary aspect. As shown, the system 100 includes a plurality of source sites 102, 104 and 106 and a plurality of target sites 112 and 114 with the essence mover 110 communicatively coupled to each site. As will be discussed in greater detail below, the essence mover 110 can be implemented as a computing device or module that is configured to dynamically and optimally manage the transfer of content from one or more source sites 102, 104 and 106 to one or more target sites 112 and 114. Although three source sites and two target sites are shown, it should be appreciate that any number of sites can be provided in alternative aspects.

In general, the source sites 102-106 are essence sources (e.g., video servers) that store media content, i.e., portions of media essence. It should be appreciated that while three source sites 102-106 are shown in system 100, more or less than three sources of content can be provided in the exemplary system. Moreover, the essence mover 110 is configured to manage the copying or otherwise transferring of source content using the algorithms and functionality described herein to one or more of the target sites 112 and 114, which can also be a single target site or more than two target sites in alternative aspects. It is also noted that while the source sites and target sides are shown as separate entities, a source site and can be collocated with a target site in an alternative aspect. That is, a single site can be configured as both a source and a target of content.

According to the exemplary embodiment, the essence mover 110 is configured to move portions of essence to order, as they are required, from the source site(s) to the target site(s), rather than having to move entire files of essence when only some part of the file is required. By doing so, the essence mover 110 is constructed to maximize the efficiency and use of scarce resources, such as time and bandwidth, over the system 100 in a media production or editing environment, for example. Moreover, it is noted that in an exemplary aspect, the essence mover 110 can be located in the cloud (e.g., a Cloud hosted platform) or on premises as best suited based on the implementation of the system 100. Similarly, each of the source sites 102-106 and target sites 112-114 can be cloud hosted platforms or on premises (e.g., hardware video servers) according to exemplary aspects.

The essence mover 110 is configured to manage the transformation and transferring of payloads of essence called grains, which are made available by one or more flows for a source of media content. Grains have a known identity and set format. A source has a plurality of flows that each contains a plurality of grains. A flow is essentially a mapping between time and grains. Moreover, a contiguous group of one or more grains is called a range and the set of grains made available by a given flow can be one or more ranges. The units of a range are measured in time, and, therefore, a range can be defined by a duration with a start time and an end time. By inference, a grain also has a range even if a single grain or payload of media essence.

In implementation, each video file or clip hosted by (or otherwise received by) a source site can be in JSON (JavaScript Object Notation) format, for example. Thus, each source site can be configured to receive and/or store video clips (in JSON) that are comprises as a number of tracks that are made up of segments (e.g., contiguous frames or "grains"). These tracks or ranges in the source each can have an identity (e.g., ID of the media). The identity of essence essentially indicates its uniqueness. Moreover, the ranges of media content can include a length (e.g., 100 frames) and offset from start of the clip. The source site can store an ID for each range and/or each file that helps access source content. These JSON files can also be stored in a database of the source site along with criteria, including time, quality and target, as discussed below, such that the essence mover 100 can be configured to access the content for transfer to a particular target at a particular time and quality. The details of this implementation will be discussed below.

Using this metadata of the media essence stored therein, each of the plurality of source sites 102, 104 and 106 is configured to offer (e.g., make available for transfer to a target site) one or a plurality of flows that are each in a single form and/or format of essence. In other words, each target site can post available media content for the essence mover 110 to access. Exemplary formats of essence can include different types of compression formats, XY size in the case that the essence is video content, or the like. In this aspect, the formats of the essence are fixed within one flow. As such, a flow maps time to bytes, such that a source site can provide a set of flows to enable the reader (e.g., the essence mover 110 and ultimately the target site) to select the form in which it would like to receive the essence from the source site.

Moreover, a source of media essence has an identity, such that two sources with the same identity carry equivalent essence. In this regard, it is noted that two identical sources do not necessarily offer the same exact flows (i.e., identical format), since the form and/or format (the terms are used synonymously) of the essence in each flow that is presented can vary depending on available facilities. Furthermore, a set of flows in a source site do not have to carry the same ranges. It should also be appreciated that accessing different instances of two identical sources may not be equal in terms of cost (e.g., consumption of resources and/or economic costs). For example, if one source is in an online archive (e.g., Amazon S3®), reading grains from this instance of a source carries a financial overhead that may not be requires if the same source essence is stored on premise in a video server, for example.

In general, accessing grains from a flow will always require a certain amount of time since grains carry a duration of a flow and a payload contains the essence for that duration. The rate of reading grains can be measured in two ways: (i) the number of bytes being read per time interval, or (ii) the duration of essence being read per time interval. For purposes of this disclosure, these are defined as the "byte rate" and the "time rate", respectively. The byte rate at which grains can be read from a flow will be affected by many factors and can vary over time. As will be described in greater detail below, the time rate at which grains can be produced is to read from alternate flows (e.g., from different source sites 102-106) to effectively and dynamically changing the byte rate to meet a desired time rate.

Thus, as described generally above, the system 100 includes a plurality of source locations (e.g., site sources 102-106) that are each configured to store (e.g., in electronic memory) a plurality of sources that can be single streams of media essence. Each of the plurality of sources at a source location (e.g., at a site source) can have a plurality of flows that each define a single form of equivalent media essence in a different format (e.g., different compression formats), and each flow can be comprised of respective ranges of grains of the media essence. As will be described in greater detail below, the essence mover 110 can be configured to access essence from different flows to dynamically and optimally change the byte rate to ensure that the requested essence is delivered to a target site to satisfy specified criteria, such as a required delivery time and minimum resolution format.

Figure 2:
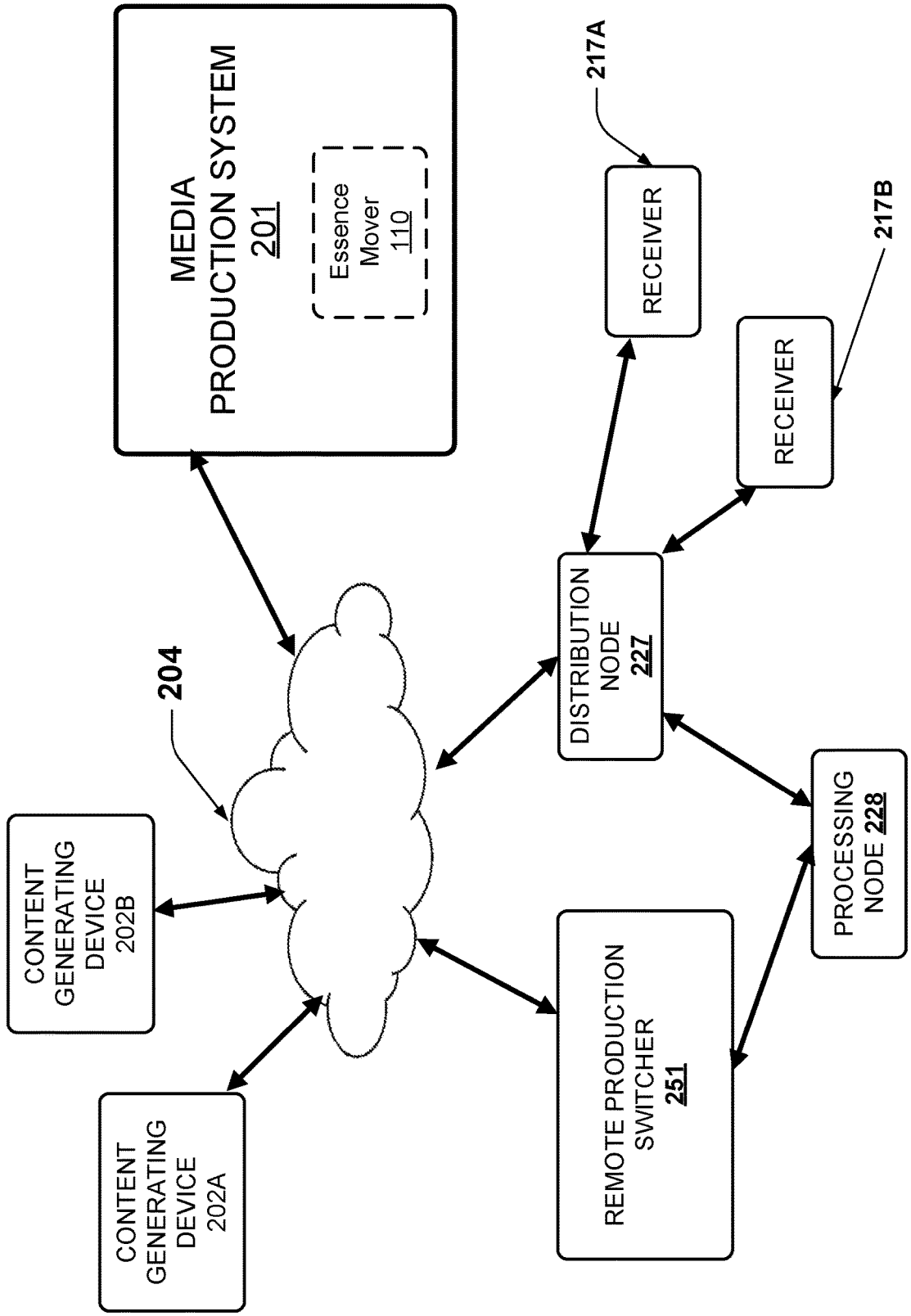
FIG. 2 is a block diagram that illustrates an example of a system for moving media content over a network according to an exemplary aspect.

FIG. 2 is a block diagram that illustrates an example of a system for moving media content over a network according to an exemplary aspect. According to this exemplary embodiment, the system is provided in the context of a media production system.

As shown, the exemplary system 200 includes a media production system 201, which can provide media content management and/or production switching functionality (e.g., a production switcher) for facilitating video production on a user interface in terms of applications and components of the system and the connections between them for consumption of media essence by end users. The media production system 201 can include including essence mover 110, as described above, and can be configured as a software based environment or engine that can be provided in a cloud-computing environment, remote production center, production truck or the like, as would be appreciated to one skilled in the art. It is reiterated that while essence mover 110 is shown as a component or module of the media production system 201, the essence mover 110 can be a stand-alone device communicatively coupled to network 204 (and the various components coupled thereto) in an alternative aspect.

It is also noted that the exemplary embodiment is described in the context of media production and specifically live or real-time media production or broadcast. In general, it should be understood that the media production system 201 is configured to facilitate streamlined and efficient media production for a technical director (TD). Thus, the media production system 201 (including essence mover 110) can generally be located remotely from all of the other components in the system and, in some embodiments, coupled to the components (which can be part of a cloud computing environment) to effectively control the system.

As shown, system 200 includes a plurality of content generating devices 202A and 202B. In an exemplary aspect, the plurality of content generating devices 202A and 202B can be configured for providing A/V feeds and streams across data communication links via the network 204. Moreover, it is noted that while only two content generating devices are shown, the system 200 can be implemented using any number of content generating devices. The plurality of content generating devices 202A and 202B can be, for example, remote cameras configured to capture live media content, such as live events and/or the "talent" (e.g., news broadcasters, game commentators, or the like). Additional, content generating devices (e.g., devices providing IP streams) can include Esports (electronic sports) real-time content, or the like. The content generating devices 202A and 202B can also be content providing devices, such video servers, that store media essence and can be configured to make available the essence, such that the content can be distributed through the media distribution system 200. In general, content generating (or providing) devices 202A and 202B are examples of source sites 102-106 as described above with respect to FIG. 1 that host media essence in the system 200.

In operation, the essence mover 110 is communicatively coupled over network 204 and configured to control each of the plurality of content generating (and/or providing) devices to transmit media essence over network 204 as part of the media production environment. In an exemplary aspect, the devices can be configured to encode the media essence in different formats as different flows of grains, as discussed above. For example, in one aspect, the media content streams can be transmitted in a high-definition (HD) format (e.g., a first format). Moreover, the plurality of content generating devices can also be configured (e.g., by use of an encoder) to format and transmit the media content streams as proxy signals (e.g., a second format at a lower resolution than HD), for example.

In particular and as further shown, the plurality of content generating devices 202A and 202B are coupled to a communication network 204. In an exemplary aspect, the essence mover 110 is specifically designed and configured to move and transform essence over wide area networks (WANs), efficiently and securely, but can also benefit on a local area network (LAN), as the algorithms and protocols in use all work well at varying scales as would be appreciated to one skilled in the art. Thus, network 204 can be implemented as a WAN or LAN, but can also more broadly be comprised of hardware conducive to internet protocol (IP) to transfer data over the Internet, for example. That is, system 200 can be comprised of a network of servers and network devices configured to transmit and receive video and audio signals of various formats. In one aspect, the processing components of system 200 can be executed in part of a cloud computing environment, which can be coupled to network 204. The media production system 201 (and essence mover 110) can be configured to access the video and audio signals and/or feeds generated by the content generating devices 202A and 202B, or information related to the various signals and content presented therein, as will be described in detail below.

In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. Thus, according to an exemplary aspect, one or more of the components (or work packages) of system 200 that can be implemented in the cloud platform as described herein.

As yet further shown, system 200 can include one or more remote distribution node(s) 227 (e.g., one or more remote production switchers or routers), which can be implemented as hardware components at various geographical locations or, in the alternative, as processing components as part of a cloud computing environment. In an exemplary aspect, the one or more distribution nodes 227 are configured to distribute the production media content from the media production system 201 to one or more distribution nodes (e.g., remote media devices), such as client devices 217A and 217B, which can be content consuming devices (e.g., televisions, computing devices, smart phones or the like) with web browsers or similar display applications configured to display the broadcast content thereon. It should also be appreciated that while only two client devices 217A and 217B are shown, the system 200 and network can include any number of content consuming devices configured to receive and consume (e.g., playout) the media content, with such content consuming devices even being distributed across different countries or even different continents. As a result, the system 200 can be configured as a media network for real-time production and broadcasting of video and audio content.

Moreover, in this network, the media production system 201 can include one or more media processing node(s) 228 and media processing functionality, which may include a mix/effects engine, keyer or the like, for performing video processing and editing functions on the received content streams. The system 200 can also include one or more remote production switcher(s) 251. As noted above, these components can be implemented as hardware components at various geographical locations or, in the alternative, as processing components as part of a cloud computing environment. It should be appreciated that in certain embodiments, the remote production switcher 251, the distribution node 227, the processing node 228 and/or the receivers 217A and 217B can be configured as target sites 112, 114 as discussed above.

Yet further, system 200 can include additional components that are typically included a video production system that are well known to those skilled in the art. For example, system 200 can include one or more codecs configured to encode the video signals at a particular compression format for the transmission to satisfy the media request parameters. The codec can be embedded in any of the various media production components (e.g., a remote video switcher or router) or alternatively be provided as a standalone component. In general, such codecs are configured to perform encoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

In general, it is noted that each of the components shown in system 200 can be implemented as a target site 112 and/or 114 as described above with respect to FIG. 1. That is, the media production system 201 can be a target site (as an example) and the essence mover 110 can be configured to move media essence from one or more of content generating (and/or providing) devices 202A and/or 202B (as the source sties) using the media transfer algorithms and techniques described below for purposes of a live media production in an exemplary aspect.

As generally described above, the systems and method for moving media content over a network includes a set of components that make up the system to move media essence and to satisfy media transfer requests that identify one or more target sites as a destination for one or a plurality of ranges of the media essence, with the transfer request defining a minimum format quality and a required time for the plurality of ranges of the media essence to be available at the target site. In this regard, a site can generally be considered a location that offers zero or more sources of media content. In addition, a target site can also offer zero or more "destinations", which are essentially targets for the essence transfers managed by the essence mover 110.

In general, a destination should also be required to offer certain properties for the transfer algorithms to work successfully. For example, a destination can offer all the same properties as a source (i.e., a destination can effectively be considered a source if it is hosting media essence), but a destination can be configured to additionally support the receipt of essence grains and thus also be configured to generate new flows based on the received essence grains. However, in this regard, a destination may be constrained in the form (e.g., format) of grains that it can receive and process (e.g., a particular destination may only be configured to decompress media essence in certain compression formats). Thus, each site can be configured to advertise or post the available set of formats that their respective destinations can receive and natively store in that particular format.

Moreover, in some exemplary aspects, the essence mover 110 can be configured to manage the compatibility of media essence between a source and a destination. In other words, a transfer of media between a source (e.g., a source site) and a destination (e.g., a target site) should be compatible and thus the grains sent to the destination must be of a form that the destination can accept and process. However, the source of this requested media content may not have flows for the range of essence required that offer grains with the correct format for the target site. As a result, the essence mover 110 can be configured to execute transcoding and/or trans-wrapping functions during the transfer process to ensure compatibility between the source and destination.

In an additional exemplary aspect, the essence mover 110 can be configured to manage transfer cost relative to ensuring compatibility between the source and destination. For example, a source site may have a plurality of flows in different formats. In certain instances, the essence mover 110 can be configured to request a lower quality flow (e.g., lower resolution stream) to read from the source that effectively enables lower cost transfers (e.g., lower bandwidth consumption). In turn, the essence mover 110 can further be configured to control a transcoding at the destination to make the lower quality essence to be compatible with the destination's constraints. That is, the essence mover 110 can be configured to access the requested content and then generate and send instructions to the destination to perform a transcoding of the media content being transmitted thereto to ensure it is compatible with the destination's constraints.

In yet another exemplary aspect, sources can be configured to offer virtual flows to the reader (e.g., the essence mover 110), such that flows that do not pre-exist may be asked to create grains at a desired format to order (e.g., upon receiving a transfer request to a target tie). This configuration to dynamically create grains in a desired format enables a simple CPU/bandwidth trade off, which provide both time and cost savings over a WAN, for example.

As described above, the essence mover 110 is configured to manage the transfer of media essence in response to a media transfer request that identifies, in part, a minimum format quality or a minimum quality requirement. Moreover, a set of flows for a range in a source site can offer the equivalent essence in different forms as described above. In combination, the target site can offer a hierarchy of perceived qualities with a video with a higher XY size, or higher frame rate being perceived to offer a higher quality viewing experience. Thus, based on the minimum format quality, the essence mover 110 can be configured to request the transfer of the media essence and the particular flow having a format that satisfies the defined minimum quality of essence. For example, the essence mover 110 can determine the minimum quality of essence (e.g., an essence quality threshold) required for the target site and then request essence from the source site that is above or meets this essence quality threshold.

In yet another variation of the exemplary embodiment, the essence mover 110 can be configured to control a site (e.g., a target site 112 or 114) to lock identified existing ranges of media essence from being deleted. In other words, sites that store large volumes of essence can generally be configured to delete essence to free up resources (e.g., memory capacity). In such instances, these sites that would otherwise delete content should be configured with a locking facility, such that the particular source can have ranges reserved such that they cannot be deleted until the lock is released. This configuration prevents required ranges of media essence from being otherwise deleted through normal resource management.

In one aspect, the way a range lock affects a set of overlapping flows can be controlled by a minimum quality requirement. For example, an external API can be provided to register a lock call for an identified range at a minimum quality by a time. This configuration will then have the effect of locking the media found within that range and minimum quality, and building a delta list of missing media that then gets processed as an arriving list as discussed below. This also has the effect that this one locking request can be seen as atomic (e.g., protected by a Mutex), so the implementation can be optionally delegated as an operation to third-party implementations.

As described above with respect to FIG. 1, the essence mover 110 is configured to receive a media transfer request (e.g., from a user interface for purposes of a media production) that specifies a destination (e.g., a target site 112 or 114) for requested media essence. In an example, a user may want to create a media production by media production system 201, but needs certain media clips from one or more of content generating devices 202A and 202B. As described in detail below, the user interface may be configured to generate a media transfer request for the desired clips, where the request specifies the minimum format and required delivery time (e.g., by pull down menus or text string instructions). Upon receiving a request to transfer essence, the essence mover 110 determines a destination for that request (e.g., the request may specify the set target site, such as media production system 201, for example). Given the determined destination and a required range of the media essence, the essence mover 110 is then configured to determine what media content (including quality) needs to be transferred to the specified target.

Figure 3:
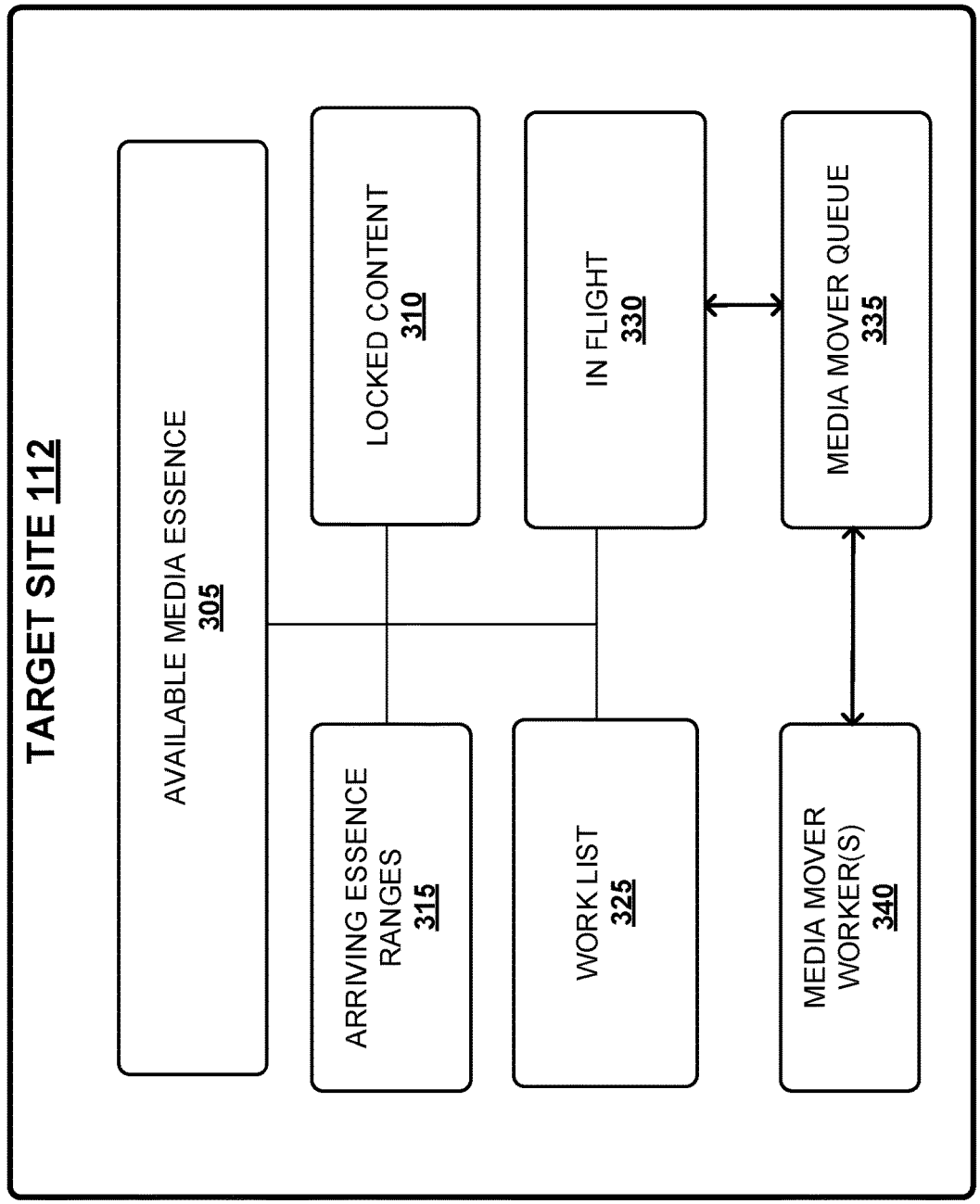
FIG. 3 is a block diagram of a target provided in a system for moving media content over a network according to an exemplary aspect.

FIG. 3 is a block diagram of a target site provided in a system for moving media content over a network according to an exemplary aspect. In response to receiving a media transfer request and identifying the destination (e.g., target site 112 as shown in FIG. 3), the essence mover 110 is first configured to query the target site 112 itself, and, in particular, the available media essence 305 that is already stored in electronic memory locally by the target site 112, for the requested range of essence and at the desired quality. The essence mover 110 manages the requested range, such that any ranges within the required range (as defined by the media transfer request) that are available at the destination are removed from the required range specified by the request. Once removed (since they are already available) from the request, the essence mover 110 dynamically adjusts the required ranges leaving a new set of required ranges that is the delta of media content that was not found in the destination, i.e., in the available media essence 305 at the target site 112. As also described above, the essence mover 110 can be configured to lock the range of available content at a minimum quality in a destination at the target site 112, such that it cannot be inadvertently deleted, for example. For example, the existing range(s) of requested essence can be associated with metadata or similar control data that prevents the target site 112 from inadvertently deleted the "locked" data in response to a memory scrubbing operation, for example, as would be appreciated to one skilled in the art.

As described above, a media transfer request stipulates the target site that requires an identified range of essence at a minimum quality by a certain time. In certain aspects, the media transfer request can also optionally specify the location of a source site(s) that contains the requested source range at or above the required minimum quality. Moreover, the media transfer request can specific the required delivery time, which, in certain instances, can indicate that there is no time requirement. In this instance, the media transfer request effectively indicates that the transfer can happen at a very low priority and effectively consume spare bandwidth capacity while not delaying more urgent transfers.

For the required ranges of media essence specified by a media transfer request that are not available at determined target site (e.g., target site 112), the essence mover 110 can further be configured to provide notification to the target site 112 that indicates to the site that the required ranges at a minimum quality will be arriving by the required time (e.g., by providing a status report).

During the media transfer over the network, there are effectively many different time durations at play that include during from the present time until completion required, the total duration to transport essence, and the desired "real-time" duration. Since all system resources are inherently constrained, these time durations enable the media transfer algorithm great flexibility to most efficiently deploy these resources to satisfy the media transfer request.

As further shown in FIG. 3, during the transfer process, the target site 112 can be configured to store a log of arriving essence ranges 315 that can be dynamically updated with the available media essence 305. The arriving list 315 is essentially a list of essence with a given flow, source, identity and format that is queued for delivery to the target site by a certain time. The list of available media essence 305 is essentially a list of essence with a given flow, source, identity and format that is currently available to be read now.

In addition, the target site 112 can be configured to manage concurrent requests for media essence. More particularly, a destination may be the target for overlapping ranges from concurrent requests, which would mean that the actual transfer list for a destination is merged between the set of requests. For example, there may be two or more requests that specify required ranges A by time Ta and required ranges B by time Tb, where the destination already contains ranges R as the available media essence 305. In this instance, the essence mover 110 is configured to process range A, lock range A, and determine the range A-R to determine this range A-R will be available at time Ta. Similarly, the essence mover 110 is configured to process range B, lock range B, and determine the range B-R to determine this range B-R will be available at time Tb.

To avoid duplicate transfers, these concurrent operations are not processed independently. Instead, the target site 112 is configured to maintain a list of arriving essence ranges 315 (that will be available by a predetermined time) as well as the available media essence 305. If the ranges A and B overlap, the essence mover 110 can be configured to first determine A-R and add A-R to the arriving list 315 that is ready by time Ta. The essence mover 110 can then be configured to determine B-R and B-(A-R). In turn, the target site 112 can add B-(R, A-R) to the arriving list 315 that will be ready by time Tb. Similarly, if Tb is earlier than Ta, the essence mover 110 can update the overlap between A and B in the list 305 to be arriving by time Tb.

According to an exemplary embodiment, the arriving list (i.e., arriving essence ranges 315) contains ranges of essence arriving at different times in response to different range requests. Each time a range of media essence is requested, such that it overlaps with a range in the arriving list, an entry to that request needs to be maintained in the arriving list. This entry can be used for a number of things.

Moreover, it should be appreciated that the essence mover 110 can enable cancellation of media transfer requests. In an aspect, cancellation would entail re-calculating what needs to arrive and by what time. Thus, any remaining requests, once the cancel request is removed would be used to determine the new arrival times of the ranges in question. That is, the arrival times could be dynamically updated since the work otherwise required to be performed for the canceled transfer can be omitted. Of course, if the remaining request list is empty on removal of a cancelled request, the arriving entry can be deleted altogether. Moreover, it is noted that only once the arriving list has been updated should the request lock be deleted.

In yet another aspect, the request reference can also act as a part of a count, where the count of requests that overlap in the ranges arriving can be seen as a vote of interest in that particular range of essence. In other words, these counts can be used to increase the priority of a transfer—or increase the actual quality transferred because the requested ranges are determined to be of additional interest. As an example, the media transfer request can be for an entire football game (e.g., 90+ minute transfer of media content), but there is also a very exciting goal or highlight that occurs in the 89th minute of the game. In this instance, an editor/user may choose the goal in the clip they want to broadcast. In conventional media transfer systems using linear transfer, the system would need to wait for all the football match to complete transferring before the editor/user gains access get to the exciting goal footage. However, the exemplary system facilitates out of order transfers where the goal footage arrives ahead of the rest of the match. To do so, a first media transfer request from the editor/user may be for the entire 90+ minute match and a second media transfer request from the editor/user may be specifically for a transfer of the minute 89-90$^{th}$ minute. By using the count (even if the two requests have the same priority), the request for the 89-90$^{th}$ minute will have two votes (or counts) for the same material. Based on these counts being higher than the single count for the remainder of the match, the essence mover 110 can be configured to move the second transfer request to a higher position in the queue in order to expedite the transfer of the second media transfer request. Moreover, in one aspect, the essence mover 110 can also ensure that the 89-90$^{th}$ minute will not be transferred twice when determining the chunks of media content to be transferred for the whole match by not generating a request (e.g., a job in the queue) to transfer the content that was already transferred in response to the second media transfer request. As a result, the entire match is eventually transferred, but the editor/user has access to the exciting goal before the remainder of the match is transferred to the target site. Accordingly, the number of total counts for each portion of content controls the priority for moving such content.

It should also be appreciated that in an alternative aspect, each of the first and second media transfer requests can also be assigned a priority, i.e., differing priorities from one another, such as "regular" priority, "high" priority and "low" priority. These different priorities can be processed by the essence mover 110 to also order the queue accordingly, with the "high" priority requests being assigned before the "regular" priority requests and the "regular" priority requests being before the "low" priority requests. Using the football example above, the second media transfer request may be assigned (e.g., by the editor or user) a "high" priority whereas the remainder of the match may be assigned a "regular" or "low" priority. By doing so, these priorities will control the essence mover 110 to ensure the media content of the exciting goal is transferred before the remainder of the match.

Referring again to FIG. 3, whenever a new request is processed by essence mover 110, when comparing the request with the available essence 305, if the available essence 305 does not satisfy the minimum quality requirement, then the essence should be seen as not available at the target site 112 and would need to be obtained from another source site.

It is also noted that whenever there is an overlap in the arriving list with a new request, the essence mover 110 can manage these overlapping lists using different media management algorithms. For example, in one aspect, the essence mover 110 requires the generation of a merged minimum quality requirement, where the higher of the two minimums takes precedence. In another aspect, the essence mover 110 maintains both arriving entries as separate entries, on the presumption that the lower quality essence is required more quickly than the higher quality entry. For example, such algorithm enables low quality quickly for broadcast and high quality slowly for archive.

In addition, according to an exemplary aspect, the essence mover 110 can be configured to initiate a transfer of media essence from a source site (e.g., source sites 102-106), the source(s) that is required by the transfer request should have the source range locked at the transferring source site. A lock is a request that ranges of essence at a minimum quality remain available for the lifetime of the lock. Locks have their own IDs, so that they can be released. This lock of the requested range should only be freed (i.e., unlocked) once the required essence is made available (e.g., in the available media essence 305) in the destination at the target site 112, for example. Moreover, the freeing of a source lock can be gradual as the essence at the target becomes available, e.g., as part of a stream being transferred for the request. To implement this locking and unlocking, the executed lock can be assigned a lock ID that can be returned to the source site to indicate that the locked media essence can then be freed. In one aspect, the source site can maintain a list of who/what has executed locks on sources so that they can be revoked in cases of error/support and the like.

Source range requests can also entail reading from a source site while flows are being mutated, as they themselves are acting a destination flows while also being offered as sources, for example, when a source site is co-located with a target site. Examples include live recording, where a request has asked for future recordings to be transferred as soon as they become available. Another example of this process can be considered a chained clone, where essence at a first site is being copied to a second site while the second site is also acting as a source for a third site.

As described above, the media transfer request received by essence mover 110 can include an indication of the source site where the required source range may be located. In addition, the essence mover 110 can be configured to maintain (or have access to) a list or log of known source sites (including source sites 102-106, for example). The essence mover 110 can then be configured to query each site for source range availability to determine which source site to read from if the media transfer request does not specify the source site for the media essence. Responses from these queries can also be cached by the essence mover 110, such that a local (cached) index can be built to respond and process future media transfer requests. It should be appreciated that multiple source site can have the requested content. For example, if two such source sites exist, but one has a higher access cost (say an online archive stored in the cloud—which incurs financial penalties for each access), then the essence mover 110 can be configured to select the source site with the lesser cost—unless there is a speed benefit to accessing the higher cost site and a tight time constraint on the request. In other words, the essence mover 110 can be configured to select the least expensive source site as long as the quality and time constraints of the media transfer request are satisfied if the media essence is accessed form this site.

Referring again to FIG. 3, one or more media mover workers 340 are provided to effectuate the transfers between sites. While shown as being components (or modules) located at the target site 112, it should be appreciated that the media mover workers 340 can be implemented as independent components or co-located with the essence mover 110 or the like. In the exemplary aspect, a minimum set of workers are deployed, though this number could be dynamic depending upon load of the media transfer request. It is noted that a worker is a logical concept that is configured to work on a single job (i.e., transferring an essence range(s) from a source to a destination) at a time. In one aspect, each of the media mover workers 340 are deployed pieces of software that can acquire jobs from the work queue 335 in order to execute the transfer requests (e.g., load operations from source sites hosting the media essence). As described in more detail below, the media mover workers 340 are also configured to report back to the work queue 335 the job status, such as progress, success or failure, which enables the essence mover 110 to make dynamic decisions of the jobs to optimize the media transfer in the network.

As further shown, a new list (i.e., a work list 325) is generated out of all the arriving lists in each destination at a target site (e.g., target site 112). The work list 325 is a list of all transfer jobs (in response to media transfer requests to the target site) and the list is ordered by the urgency of starting each job. The work list 325 can accumulate all arriving list for a plurality of media transfer requests for that target site 112. The entries of the work list 325 are ordered by job start time, where the job start time is a combination of the required arrival times, and an estimate of how much time a particular entry will need to be completed (i.e., an estimated transfer time). Moreover, a seed estimate of the transfer time can be determined by configuration, for example, 10 times the duration of the request. The work list 325 is managed by a controller (e.g., the essence mover 110 or a separate entity) that scans the first N entries in the list, where N can be approximately double the deployed workers. Each entry scanned (which can be considered a job "in-flight" 330) will have a part of its range added to a media mover queue 335, which is a sub-list of jobs from the work list 325 that are destined to be assigned to workers for execution. The size of the range for each job in the queue 335 can be classified by chunk size and is measured in time. The chunk size of each work queue entry is determined by configuration (e.g., in the order of ten seconds, but may be much more) and the identity of the work queue entry will be added to the corresponding entry of the work list 325. The chunk size is effectively the size of a job to be created out of an entry in the work list 325 and added to the work queue 335.

It is noted that the estimated transfer rate for a first source site (e.g., source site 102) could be seeded explicitly, such that a second source site (e.g., source site 104) might have quite a different estimate. In addition, the chunk size used for different source sites might vary as well. For example, high transfer speeds require much higher chunk sizes to minimize the required processing overhead for each job, so that the overall effective throughput of the system is not limited. Yet further, the estimated transfer rate—in effect the job throughput—is also going to be affected by whether the transfer requires a transcoding function, as described above. If so, the essence mover 110 can be configured to add an estimate of the additional time this processing requires based on experience and passed media transfers and transcoding. For example, transcoding of a certain chunk size will require additional number of milliseconds so the total number of chunks and each hunk size can help the essence mover 110 estimate the additional time required for the transcoding functions to ensure the transferred media essence is in a format compatible with eh target site.

It should also be noted that certain types of target sites cannot handle receiving ranges for the same destination that are out of order, for example, if the target site is building a monolithic file. In this instance, a mechanism is provided where there is a limit of only one queue entry per destination. As such, the target site will need to indicate this constraint in their site properties, which is published to the essence mover 110.

Moreover, the entries in the work list 325 can have their effective start times delayed and durations shortened by the process of having chunks of work broken off and added to the media mover queue 335, so their place in the priority of the work list 325 gets updated accordingly. This optimal management can be performed by the workers 340, which can be managed by essence mover 110, in order to maximize the efficiencies of transferring content over the network. That is, certain jobs may be performed as their most urgent requirements are getting met. Each worker can adjust the processing of the transfer based on the estimated time of delivery (i.e., when the content is made available at the target site) compared with the specified delivery time set forth in the media transfer request. For example, if the delivery time calculated (based on the intrinsic knowledge of the content itself) is determined to be well before the required delivery time, this particular job can be adjusted to a lower priority in the media mover queue 335. Also, adding work into the media mover queue 335 can be considered irreversible in an exemplary aspect and further additions to the work list 325 cannot remove entries that have been added to the media mover queue 335. Thus, changing the priority of a request will not affect the current media mover queue 335 and only the entries in the work list 325.

As further shown in FIG. 3, items in the media mover queue 335 can be assigned workers (e.g., media mover workers 340) to execute the transfer jobs. Each job reads from a source (e.g., a source site) using a particular flow as described above. Moreover, the specific worker may need to transform the resulting grains (as also discussed above), and then the worker will send the grains to the destination of the target site. Progress of each job is reported back to the media mover queue 335, with the units of this report being in time ranges according to an exemplary aspect.

Moreover, the controller (e.g., essence mover 110) of the work list 325 monitors the progress of each job in the media mover queue 335. This monitored progress determines the estimate of how much time a particular entry will need to be completed and can affect the ordering of the work list 325. That is, the essence mover 110 is configured to optimally balance the jobs in the media mover queue 335 to ensure the time constraints of each request are satisfied. In an exemplary aspect, there may be a plurality of constraints to balance. For example, in one aspect, the media transfer request may specify that the target site 112 needs to receive an update at least every X (e.g., a predefined number, such as 1, 2, 3, etc.) seconds and otherwise the receiving device might time out, for example. In another example, a much harder constraint is starting to play out at the target before all the media in a clip has arrived. In this case, the essence move 110 must ensure that the media must be delivered in time to make the 'play' of the media content and can reorder or balance the queue to ensure the requests are satisfied.

In addition, this progress can be compared to the time constraints that each arriving entry provided. For example, if a job is lower in the media mover queue 335 and the controller determines that it will not satisfy the required time based on the progress reports, the controller can move that specific job up the order in the media mover queue 335. Moreover, if progress is too slow to achieve the desired arrival time, the job can be adjusted to request a lower quality flow that can be moved quicker through the network. If there are no lower quality flows that would satisfy the minimum quality requirement defined by the media transfer request, then the job will be marked as late and can be reported to a user using a user interface for the media production, for example.

In an exemplary aspect, the generation of the work list 325 and the media mover queue 335 should be an ongoing operation, so that the list and queues are live data-structures that dynamically reflect the state of the system. As work queue items are completed, then the next highest priority items in the work list 325 need to be added to the media mover queue 335, such that the work queue backlog is always approximately double the deployed workers. As new requests are received, then the work list 325 can be dynamically updated to reflect the new priorities of the system. It should be appreciated that if subsequent requests are received with new constraints (e.g., a tighter required by time), these updates should be processed into the work list 325 by changing the priorities, but without stopping any chunks that have already been placed on the media mover queue 335.

As an example, source sites may comprises media essence for 3-4 sports events and 2-3 target side require content for various editing processes. The source sites can be configured to make the media essence from these sports events available different formats for different media broadcasting stations and also lower format/quality on web-based presentations. The essence mover 110 is configured to optimize what content at what quality is being transferred and this can be done because of the intrinsic knowledge (e.g., the metadata) about the media content to be transferred. Additional metadata can include names, ownership, assets, dates and the like about the essence. The essence mover 110 is configured to conform the available media by pulling the required ranges of media essence together based on relevant metadata so that they are ready to be rendered and played out at a required time. This is achieved by balancing the loading of media content using the algorithms described herein with dynamic feedback for the transferring processes of each required range.

Moreover, if any items in the media mover queue 335 fail for any reason, then the chunks that have failed to transfer will need re-adding to their respective entry in the work list 325. Additional error handling procedures will need to be invoked, such as retry counts and back-off policies while flagging failures in user interfaces, for example. In one aspect, chunks that need a retry should turn amber in the user interface (and turn green on success) reflecting progress issues, and red on failure.

The size of each chunk of media content to be transferred will also affect the operations of the media transfer system as a whole. In particular, the chunk size used to break parts off the entries in the work list 325 when creating entries in the media mover queue 335 determines the responsiveness of the system. Specifically, a short chunk size means the system very quickly adjusts to changing requirements, whereas a long chunk size means each job completes more of the required work. However, there is less overhead with a long chunk size as discussed above. The essence mover 110 can be configured to set the chunk size to manage system constraints and also to satisfy the time constraints in an exemplary aspect.

It should further be appreciated that the list of available media essence 305 can be dynamically updated by new arrivals of media content. The arriving list (e.g., the arriving essence ranges 315) can also be updated by the arrival of new essence at a destination by removing some of the ranges in that arriving list. In one aspect, entries in the arriving list are only updated with new arrivals of media content once the available list reflects these new arrivals, otherwise repeated transfers become possible.

Figure 4A:
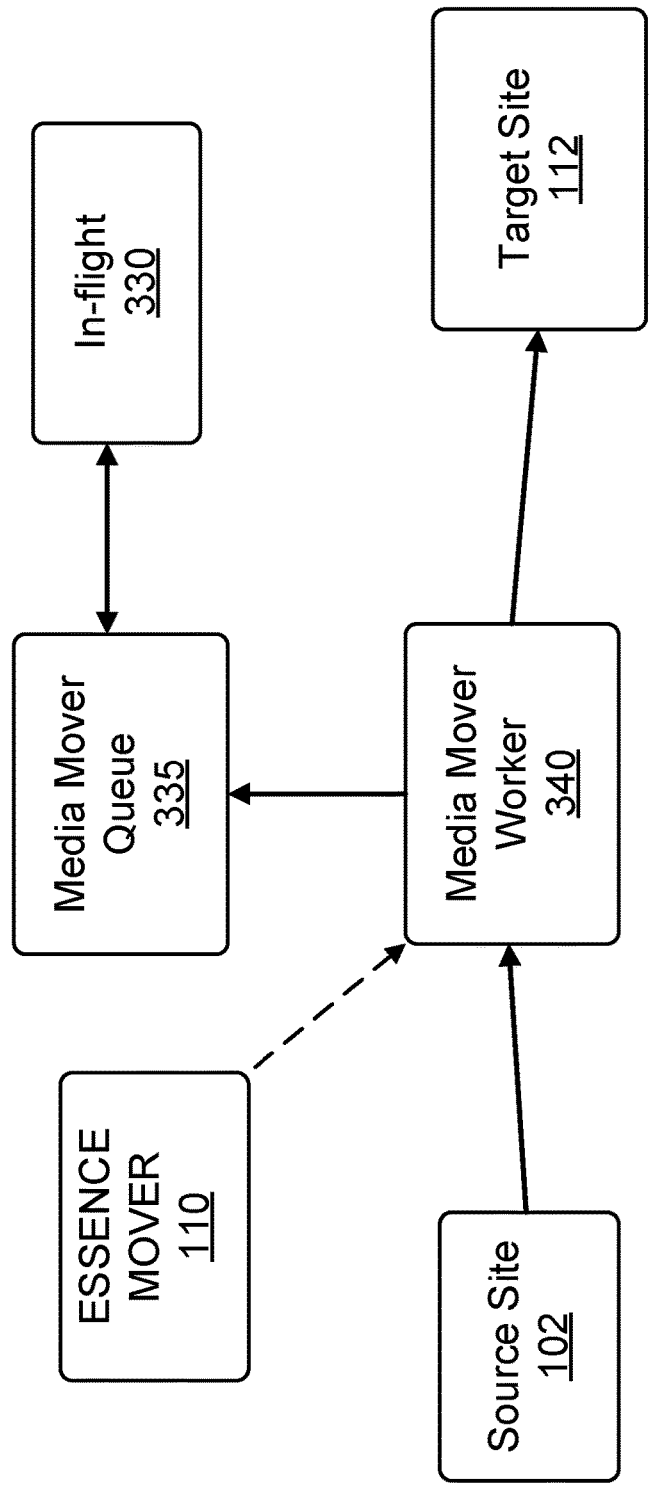
FIGS. 4A and 4B are flow diagram implementing the system for moving media content over a network according to an exemplary aspect.
Figure 4B:
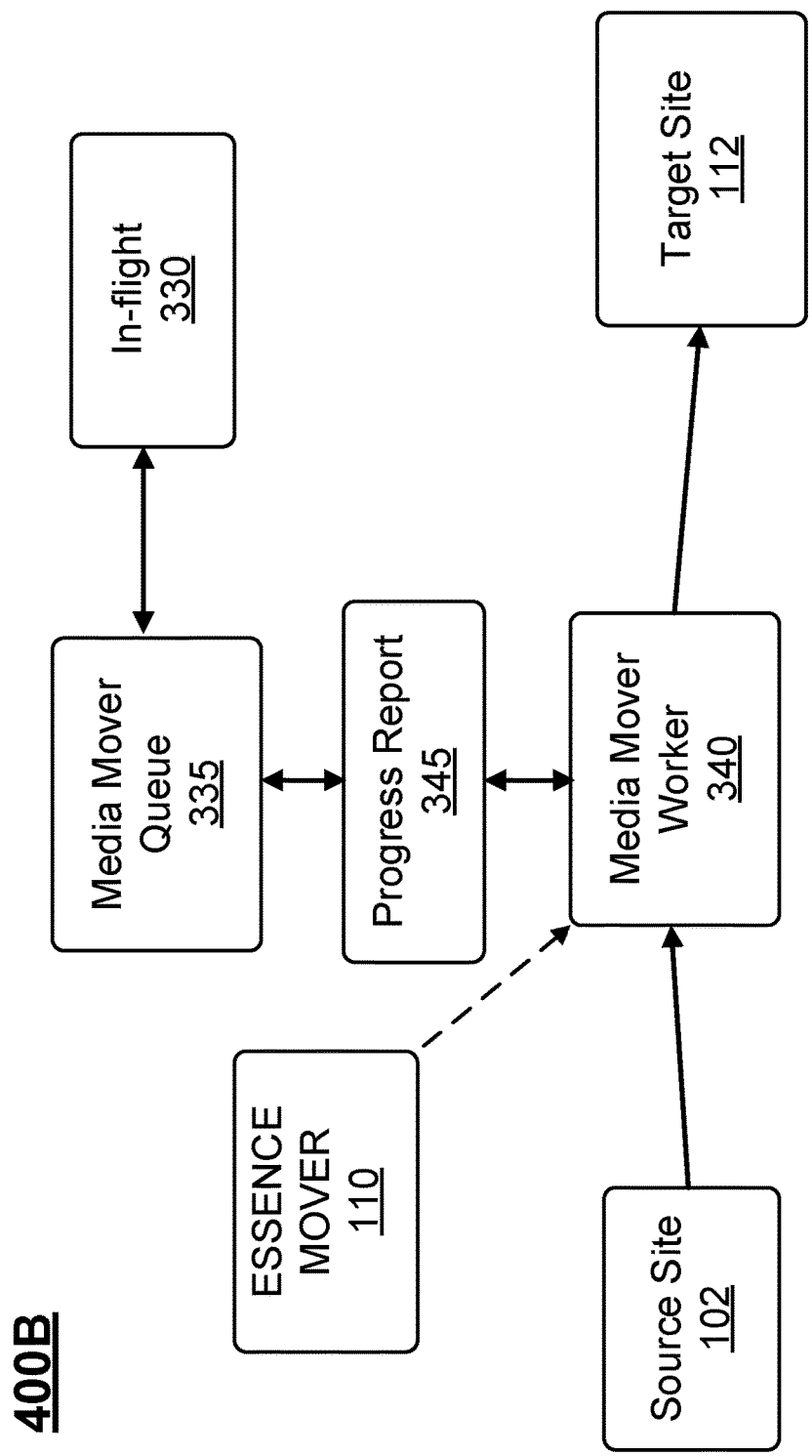

FIGS. 4A and 4B are flow diagrams implementing the system for moving media content over a network according to an exemplary aspect. In general, it should be noted that the flow diagrams 400A and 400B can be implemented using the components described above with respect to FIGS. 1-3, for example.

In this aspect, the essence mover 110 can be configured as a media managing processor that is configured to receive a media transfer request that identifies a target site, such as a target site 112, as a destination for one or more likely a plurality of ranges of the media essence. Moreover, the transfer request can define a minimum format quality and a required time for the plurality of ranges of the media essence to be made available on the target site 112.

In an exemplary aspect, the media transfer request can be generated by a user interface, such as a user interface provided for an operator of media production system 201 as shown in FIG. 2. Moreover, individual media transfer requests are preferably at the lowest level of abstraction in an exemplary aspect. For example, a user may prefer to deal with clips and timelines for the requested essence. When a user asks to make a clip available at a minimum quality at a destination (i.e., the target site 112) by a certain time, that clip can be broken down into a clip time ordered bill of materials, each having its own time-available requirement. As also described above, this analysis can account for an allowance for any rendering or processing that is required for post transfer, as the user's requirement is for clip availability. Moreover, the mapping between clips and essence ranges should be kept and be reversible to support the request, accommodate for cancel commands, and the like. In one aspect, the clips structures can be indicated in the user interface with individual progress bars for each essence range in the clip as also discussed above. Yet further, the user interface can be configured for the user to define priority of multiple transfer requests, and, thus, enable the users to promote certain clips to a higher priority.

FIG. 4A illustrates a step of effectively negotiating the transfer process from source site to target site. Upon receiving the media transfer request, the essence mover 110 is first configured to query the target site 112 to identify any existing ranges of the plurality of ranges of the media essence that are stored thereon and that satisfy the defined minimum format quality. To the extent any such ranges exist and are present on the target site, the essence mover 110 is configured to control the target site 112 to lock the identified existing ranges of the plurality of ranges of the media essence from being deleted.

Next, the essence mover 110 is configured to determine a delta of essence ranges that are defined in the media transfer request, but not currently available at the target site 112. That is, the essence mover 110 compares the entire range of the media request with the available essence that is locked at the target site 112 to determine the delta of "missing" essence. In this instance, the essence mover 110 is further configured to generate a media transfer work list (e.g., work list 325) that identifies one or more tasks for transferring required ranges of the plurality of ranges defined by the transfer request that is not available at the target site 112, i.e., the missing essence that needs to be transferred to the target site 112.

Based on the work list 325, a controller, such as essence mover 110, is configured to scan each entry in the work list 325 and have each entry (or ranges within each entry) added to media mover queue 335. As further described above, each of the items in the media mover queue 335 can be assigned workers (e.g., media mover workers 340) to execute the transfer jobs. This assigning of workers can also be performed by the essence mover 110, for example.

As also described above, the media transfer request can specify the source site or, in the alternative, the essence mover 110 can query source sites to determine if a particular site has the requested range of media essence for that particular job in the queue 335. In either event, once assigned, the media mover worker 340 is configured to select the source location that has a flow that includes the required range of the media essence at a first format that satisfies the defined minimum format quality. In this regard, each source site can publish a list of essence ID ranges at available format qualities. The media mover worker 340 can query these ID ranges to in turn select the source location having the essence range at the quality that matches the acceptable quality for the media transfer request to the target site 112. In some instances, the media mover worker 340 can be configured to perform a transcoding or transform of the essence to facilitate the transfer as described above.

Referring now to FIG. 4B, the transfer of the media essence range from the identified source site (e.g., source site 102) to the target site 112 is executed. That is, the media mover worker 340 can be configured to execute a load operation of the one required range of media essence from the source location 102 to the identified target site 112 and update the media mover queue 335 to include the task to monitor a progress of the load operation of "in-flight" media essence 330 to the target site 112 for satisfying the required time. In one aspect, the media mover worker 340 can be configured to generate one or more progress reports 345 for each job in the media mover queue 335. More particularly, the media mover worker 340 can be configured to send reports to the media mover queue 335, which can accumulate all the reports for a particular transfer to gain a total overview of the effective throughput for the transfer that the system is achieving. So I would draw the progress report 345 being delivered from the queue 335.

If it is determined that the current transfer of media essence at a set quality will not meet the time constraints defined by the media transfer request, the media mover worker 340 may be configured to dynamically adjust the transfer process to adjust the criteria in order to satisfy the time constraint. More particularly, the media mover worker 340 can be configured to control the selected source location (or a different source location) to load a second flow that includes the required range of the media essence at a second format that is lower than the first format when the monitored progress indicates that the load operation will not be completed by the required time. Specifically, as described above, each job is "chunked" into media content. Thus, in operation, a short range of the required essence is broken off from the chunk and made into a separate task for a media mover worker 340 using the algorithms described above. If the accumulated rate of these chunks is determine to be too slow to meet the timing criteria defined by the media transfer request, then the next time a chunk is broken off for a job, the essence mover 110 selects a lower quality (e.g., in the second format). The chunk size may be measured in time or in bytes depending upon the configuration as also described above and the actual size of each chunk will be determined by the throughput of the transfer.

In one aspect, if a lower quality essence range is not available or the current quality of the transferring stream is the minimum quality defined by the media transfer request, the progress report 345 can be configured to generate a report to the user that the transfer request will not be completed by the time constraint. In this aspect, the user may be presented with additional options to select alternative content or the ability to lower the defines minimum quality.

Figure 5:
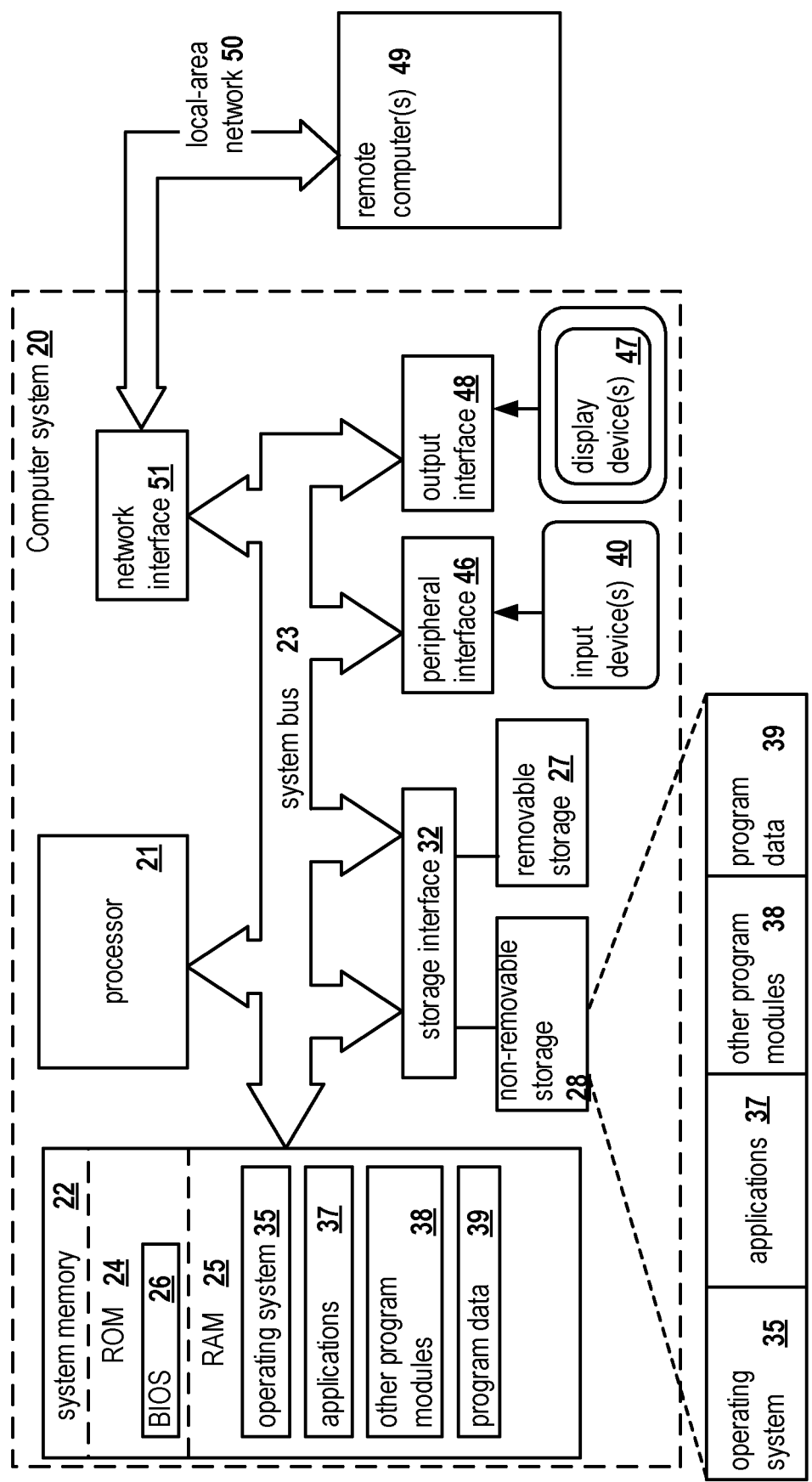
FIG. 5 is a block diagram illustrating a computer system on which aspects of systems and methods for moving media content over a network according to an exemplary embodiment.

FIG. 5 is a block diagram illustrating a computer system on which aspects of systems and methods for moving media content over a network according to an exemplary embodiment. In general, the computer system 20 can correspond to any computing system configured to execute the disclosed systems and method described herein or any components therein, including media production system 201, essence mover 110 and any of the source sites and target sites, for example. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the media essence sites as described above with respect to FIGS. 1-4 as well as generally to a cloud computing platform for configuring the media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. As described above, a module can refer to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIGS. 1 and 2, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for providing media essence over a network, the system comprising:
  a memory; and
  a processor configured to implement instructions on the memory so as to provide:
    a media manager configured to:
      receive a transfer request from a target site as a destination for a plurality of ranges of the media essence, with the transfer request defining a minimum format quality and a required time for the plurality of ranges of the media essence to be available,
      generate a media transfer work list that identifies a task for transferring at least one required range of the plurality of ranges defined by the transfer request; and
    a media mover worker configured to:
      select at least one source site of a plurality of source sites that has a first flow that includes the at least one required range of the media essence at a first format that satisfies the defined minimum format quality,
      execute a load operation of the at least one required range of media essence from the at least one selected source site to the target site,
      update a media mover queue to include the task to monitor a progress of the load operation for satisfying the required time, and
      control the selected at least one source site to load a second flow that includes the at least one required range of the media essence at a second format that is lower than the first format when the monitored progress indicates that the load operation will not be completed by the required time.

2. The system according to claim 1, wherein the media manager is further configured to:
  query the target site to identify any existing ranges of the plurality of ranges of the media essence that are stored thereon and that satisfy the defined minimum format quality,
  control the target site to lock the identified existing ranges of the plurality of ranges of the media essence from being deleted, and
  generate the media transfer work list that identifies the task for transferring the at least one required range of the plurality of ranges defined by the transfer request that is not available at the target site.

3. The system according to claim 2, wherein the media manager is further configured to determine a delta that identifies the at least one required range of the plurality of ranges that is not available at the target site by comparing the locked existing ranges of the plurality of ranges of the media essence at the target site with the plurality of ranges of the media essence listed in the received transfer request.

4. The system according to claim 1,
wherein the target site is configured to receive available formats of the media essence that can be natively stored thereon,
wherein the plurality of source sites are each configured to store a plurality of sources that are single streams of media essence, and
wherein each of the plurality of sources at a source site has a plurality of flows that each define a single form of equivalent media essence in a different format, and each flow is comprised of respective ranges of grains of the media essence.

5. The system according to claim 4, wherein each of the plurality of source sites is configured to store an identification for each of the respective ranges of grains of each flow, and the media mover is configured to select the at least one source site based on the respective identification for the at least one required range of the media essence.

6. The system according to claim 1, wherein the media mover is configured to control the selected at least one source site to load the second flow that includes the at least one required range of the media essence at the second format to change a byte rate of the load operation to ensure that the at least one required range of the media essence is delivered to the target site by the required time.

7. The system according to claim 1, wherein the media mover is further configured to transcode the at least one required range of the media essence from the first format to another format to ensure the at least one required range of the media essence satisfies the defined minimum format quality.

8. The system according to claim 1, wherein the media mover is configured to dynamically provide a status report to the target site to confirm whether the plurality of ranges of the media essence will be delivered at the minimum format quality and by the required time, such that the target site maintains a list of arriving ranges of the media essence to prevent overlapping requests of media essence.

9. The system according to claim 1, wherein the media manager is configured to prioritize the generated media transfer work list by reordering each of the plurality of ranges based on a number of requests for each respective range of the media essence.

\* \* \* \* \*